Dec. 24, 1940. C. F. RICHTER 2,226,388
FOLD COLLAR FOR MOTOR VEHICLES
Filed May 18, 1940
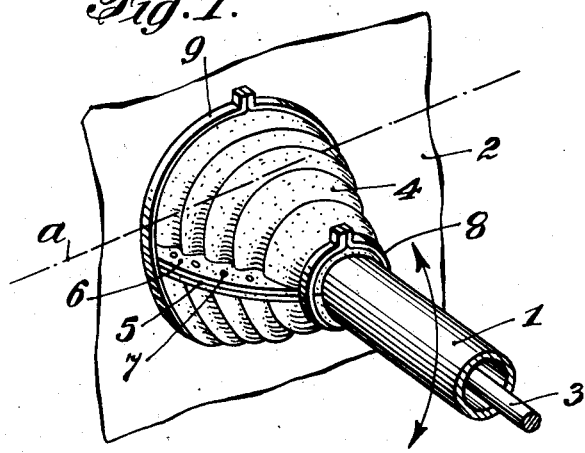
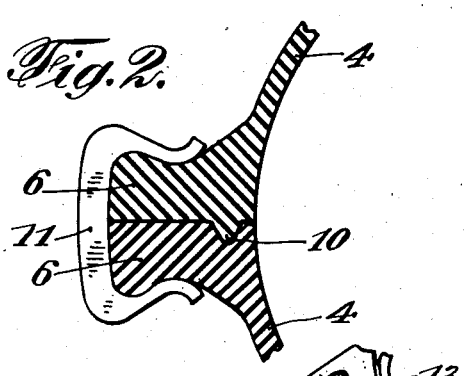
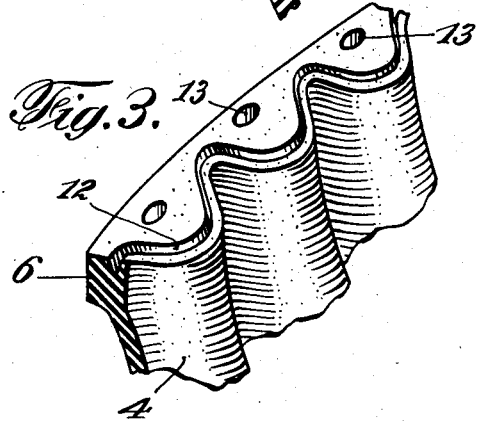
INVENTOR.
Carl Friedrich Richter
BY C. P. Goepel
his ATTORNEY.

Patented Dec. 24, 1940

2,226,388

UNITED STATES PATENT OFFICE 2,226,388

FOLD COLLAR FOR MOTOR VEHICLES

Carl Friedrich Richter, Hanover, Germany, assignor to Continental Gummi-Werke Aktiengesellschaft, Hanover, Germany Application May 18, 1940, Serial No. 335,898
In Germany May 19, 1939

5 Claims. (Cl. 74—607)

The invention relates to a fold collar of rubber or rubber substitutes, preferably for the tightening of the point of connection of two machine parts which move to and fro in one plane, for instance of the swing axle of a motor vehicle, which moves up and down in a perpendicular direction, in relation to the axle-drive casing.

The object of the invention is to provide an improved fold cover, and the improvement consists in the fact that the collar is divided laterally and the edges of the collar are reinforced by flexible rubber flanges, which are pressed one upon another by means of fastenings that do not impair the flexibility.

The invention consists further in providing registering devices in which one is a little larger than the other, and lastly, in that they extend parallel to the wave-shaped inner boundary of the collar.

Finally, the invention consists in the fact that the rubber flange fills up substantially only the recess between the waves of the collar cross section and projects only slightly beyond their vertices.

The invention will be described in detail hereinafter, embodiments thereof shown in the drawing, and the invention will be finally pointed out in the claims.

In the accompanying drawing:

Figure 1 is a perspective view of the improved collar embodying my invention;

Figure 2 is a section through a flange connection; and

Figure 3 is a perspective view of a flange, forming one form.

Similar characters of reference indicate corresponding parts throughout the various views.

Referring to the drawing, the swing axle 1 executes, in conformity with the double arrow inserted in the drawing, upward and downward swings in relation to the axle-drive casing 2 around the axis $a$. It contains on the inside the wheel-drive shaft 3. The point of connection between the swing axle 1 and the drive casing 2 is bridged by the rubber collar 4, the wall of which, for the purpose of augmentation of its deformability, is in a well known manner fashioned in wave shape. Toward the side, 1. e., at right angles to the plane of movement of the swing axle 1, the collar is divided along the line 5 and is there provided with two flanges 6 likewise consisting of rubber. The flanges 6 are pressed upon one another by means of screws or rivets 7 extending into suitable registering openings 13 (Fig. 3) in the flanges, or by means of short applied clamps 11 (Fig. 2). The tightening bulge provided at the contact surface of the flanges is marked 10, the appurtenant recess 12. The attachment of the collar 4 to the drive casing 2 and upon the swing axle 1 may be effected by means of tension bands 9 and 8 respectively, or else also by a counterscrew by means of a press-on frame.

Heretofore such fold collars were constructed in undivided form and were built in along with the assembling of the axle. This represented a defect, however, since the replacement of the collar, which is greatly imperiled in case of the travel of the motor vehicles in the country through crushed stone, brushwood, etc., and in case of such wear and tear is also frequently destroyed, proves to be very difficult. The entire swing axle has to be loosened and taken off both at its point of connection with the axle drive casing, and also from the supporting spring. This drawback is abolished by the improved means, in that the collar is divided laterally and that the collar edges are reinforced by the flexible rubber flanges which are pressed upon one another by means of fastenings that do not impair the flexibility (screws, rivets, clamps). The flange connection by means of the flexible rubber flanges that have been described, has been proven to be oiltight and very reliable in service. As a result of the lateral arrangement of the flange connection, at right angles to the direction of movement of the swing axle, where it is subject only to flexure, but not to tractive or compressive movements, the flange connection does not restrict the deformability of the collar.

As described, for improvement of the tightening, one of the rubber flanges has on its contact surface a bulge which fits into a corresponding recess of the counterflange. The cross section of the bulge may be somewhat greater than that of the recess, in order that its side surfaces shall be pressed firmly against those of the groove-shaped recess.

The fold collar remains flexible also with respect to movements in the plane of division, if the rubber flanges fill up substantially only the recesses between the waves of the collar cross section and project only slightly beyond their vertices. In this case the tightening bulge and the appurtenant recess expediently extend parallel to the wave-shaped inside boundary of the collar.

I have described an embodiment of my invention, but it will be clear that changes may be made within the principle of the invention described, without departing from the scope of the subjoined claims.

I claim:

1. A fold collar of rubber for the sealing of a swing axle of a motor vehicle, which moves up and down in a perpendicular direction in relation to the axle drive casing, said collar being divided laterally and having collar edges, flexible rubber flanges for reinforcing said edges, pressed upon one another, and means for fastening said flanges together.

2. A fold collar of rubber for the sealing of a swing axle of a motor vehicle, which moves up and down in a perpendicular direction in relation to the axle drive casing, said collar being divided laterally and having collar edges, flexible rubber flanges for reinforcing said edges, pressed upon one another, and means for fastening said flanges together, one of the rubber flanges having on its contact surface a bulge, and the other having a recess fitted to the bulge on the counterflange.

3. A fold collar of rubber for the sealing of a swing axle of a motor vehicle, which moves up and down in a perpendicular direction in relation to the axle drive casing, said collar being divided laterally and having collar edges, flexible rubber flanges for reinforcing said edges, pressed upon one another, and means for fastening said flanges together, one of the rubber flanges having on its contact surface a bulge, and the other having a recess fitted to the bulge on the counterflange, the cross section of the bulge being somewhat larger than that of the recess.

4. A fold collar of rubber for the sealing of a swing axle of a motor vehicle, which moves up and down in a perpendicular direction in relation to the axle drive casing, said collar being divided laterally and having collar edges, flexible rubber flanges for reinforcing said edges, pressed upon one another, and means for fastening said flanges together, one of the rubber flanges having on its contact surface a bulge, and the other having a recess fitted to the bulge on the counterflange, the bulge and the recess extending parallel to the wave shaped inner boundary of the collar.

5. A fold collar of rubber for the sealing of a swing axle of a motor vehicle, which moves up and down in a perpendicular direction in relation to the axle drive casing, said collar being divided laterally and having collar edges, flexible rubber flanges for reinforcing said edges, pressed upon one another, and means for fastening said flanges together, one of the rubber flanges having on its contact surface a bulge, and the other having a recess fitted to the bulge on the counterflange, the rubber flanges filling up substantially only the recess between the waves of the collar cross section and projecting only slightly beyond their vertices.

CARL FRIEDRICH RICHTER.